(12) United States Patent
Stevenson et al.

(10) Patent No.: US 7,077,742 B2
(45) Date of Patent: Jul. 18, 2006

(54) PRESSURE RELIEF VALVE AND METHOD OF FORMING THE SAME

(75) Inventors: Jordan Stevenson, Walled Lake, MI (US); Thomas E. Blake, III, South Lyon, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/818,254

(22) Filed: Apr. 5, 2004

(65) Prior Publication Data

US 2005/0227607 A1  Oct. 13, 2005

(51) Int. Cl.
*F24F 13/08* (2006.01)

(52) U.S. Cl. .................... 454/259; 454/353; 454/359

(58) Field of Classification Search ............... 454/162, 454/164, 165, 259, 353, 359; 137/517.1, 137/527, 527.6
See application file for complete search history.

(56) References Cited

U.S. PATENT DOCUMENTS

| | | | |
|---|---|---|---|
| 3,590,858 A * | 7/1971 | Martin | ..................... 137/493.3 |
| 4,230,150 A | 10/1980 | Scaramucci | |
| 4,546,695 A | 10/1985 | Ouchi et al. | |
| 5,105,849 A | 4/1992 | Clough | |
| 5,295,478 A | 3/1994 | Baldwin | |
| 5,298,215 A | 3/1994 | Krause | |
| 5,305,787 A * | 4/1994 | Thygesen | ................... 137/527 |
| 5,355,910 A | 10/1994 | Gies et al. | |
| 5,419,739 A | 5/1995 | Lewis | |
| 5,492,205 A | 2/1996 | Zhang | |
| 5,601,117 A | 2/1997 | Lewis et al. | |
| 5,617,897 A | 4/1997 | Myers | |
| 5,715,782 A | 2/1998 | Elder | |
| 5,727,999 A * | 3/1998 | Lewis | ........................ 454/162 |
| 5,738,087 A * | 4/1998 | King | ..................... 128/200.23 |
| 5,759,097 A * | 6/1998 | Bernoville et al. | ......... 454/162 |
| 5,904,618 A * | 5/1999 | Lewis | ........................ 454/162 |
| 6,026,852 A | 2/2000 | Barton et al. | |
| 6,119,723 A * | 9/2000 | Kenyon | ...................... 137/527 |

(Continued)

FOREIGN PATENT DOCUMENTS

EP  0673795  9/1995

(Continued)

*Primary Examiner*—Gregory Wilson
(74) *Attorney, Agent, or Firm*—Tarolli, Sundheim, Covell & Tummino LLP

(57) ABSTRACT

A pressure relief valve (10) includes a housing (12) with a peripheral side wall defining at least one central airflow passage and at least one flap valve element (14). The housing (12) and the flap valve element (14) have a molded connection for enabling rotation of the flap valve element relative to the housing between a closed condition overlying the at least one central airflow passage (24) to prevent airflow from atmosphere (21) into the passenger compartment (19) and an open condition permitting airflow out of the passenger compartment of the vehicle to atmosphere. The at least one flap valve element (14) moves from the closed condition to the open condition in response to differential pressure between the passenger compartment (19) and atmosphere (21). A method of manufacturing the pressure relief valve (10) includes the steps of molding a housing (12) with a first plastic material; molding a valve element (14) with a second plastic material different from the first plastic material and forming a connection between the valve element and the housing simultaneous with the molding of a latter one of the valve element and the housing.

30 Claims, 4 Drawing Sheets

U.S. PATENT DOCUMENTS

| | | | |
|---|---|---|---|
| 6,132,308 A * | 10/2000 | Dietz et al. | 454/162 |
| 6,135,543 A | 10/2000 | Esposito et al. | |
| 6,210,266 B1 | 4/2001 | Barton | |
| 6,357,473 B1 | 3/2002 | Porter et al. | |
| 6,648,749 B1 * | 11/2003 | Hayashi et al. | 454/162 |

FOREIGN PATENT DOCUMENTS

| | | |
|---|---|---|
| EP | 0874182 | 10/1998 |
| EP | 0912357 | 4/2002 |
| EP | 0861748 | 5/2002 |

* cited by examiner

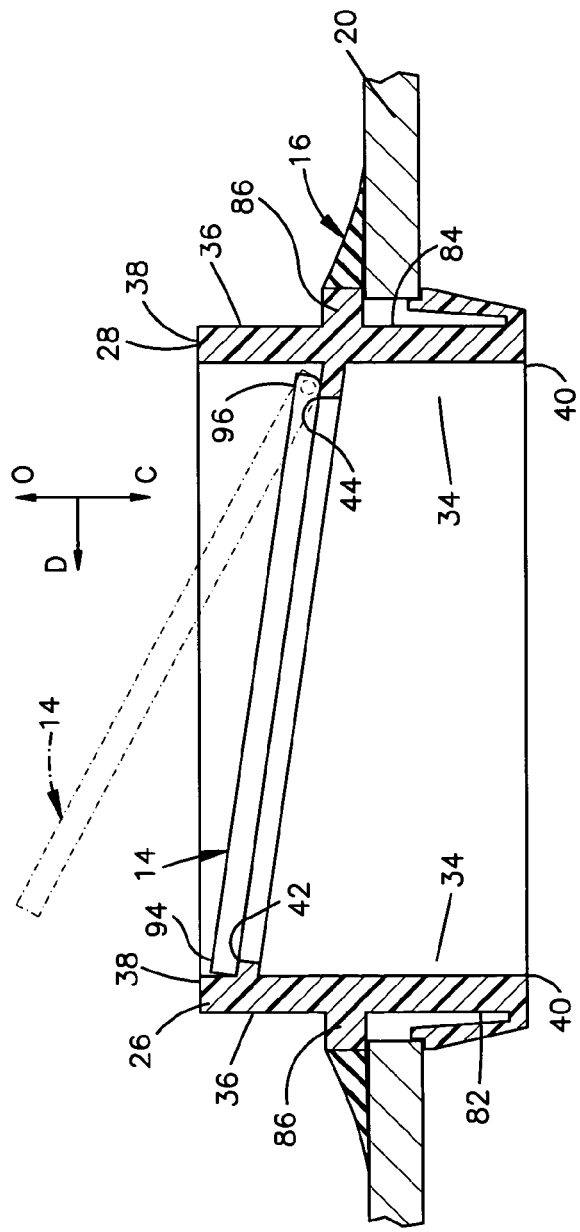
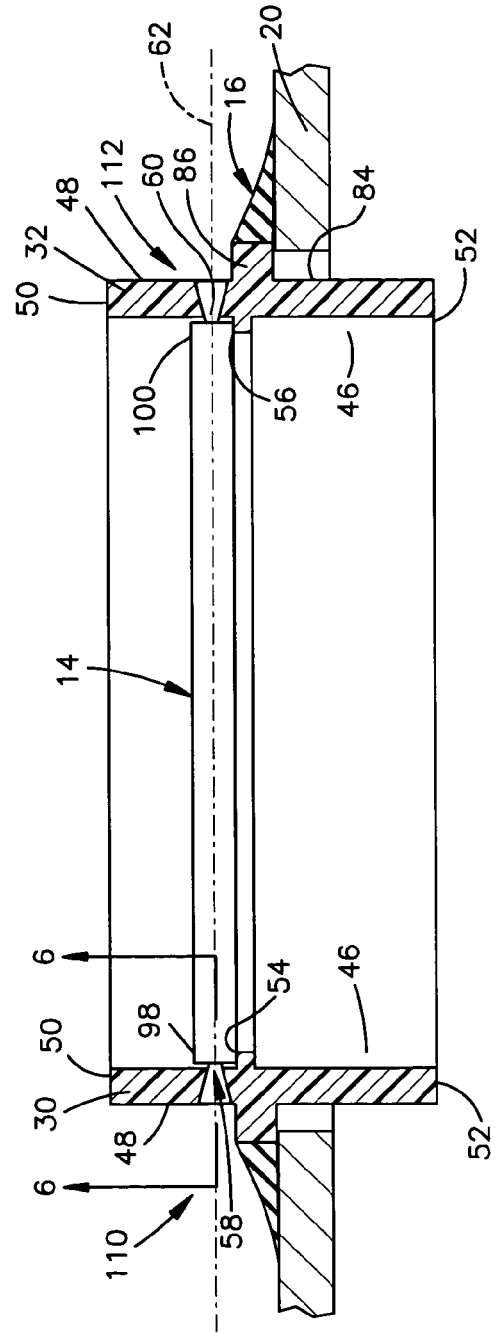

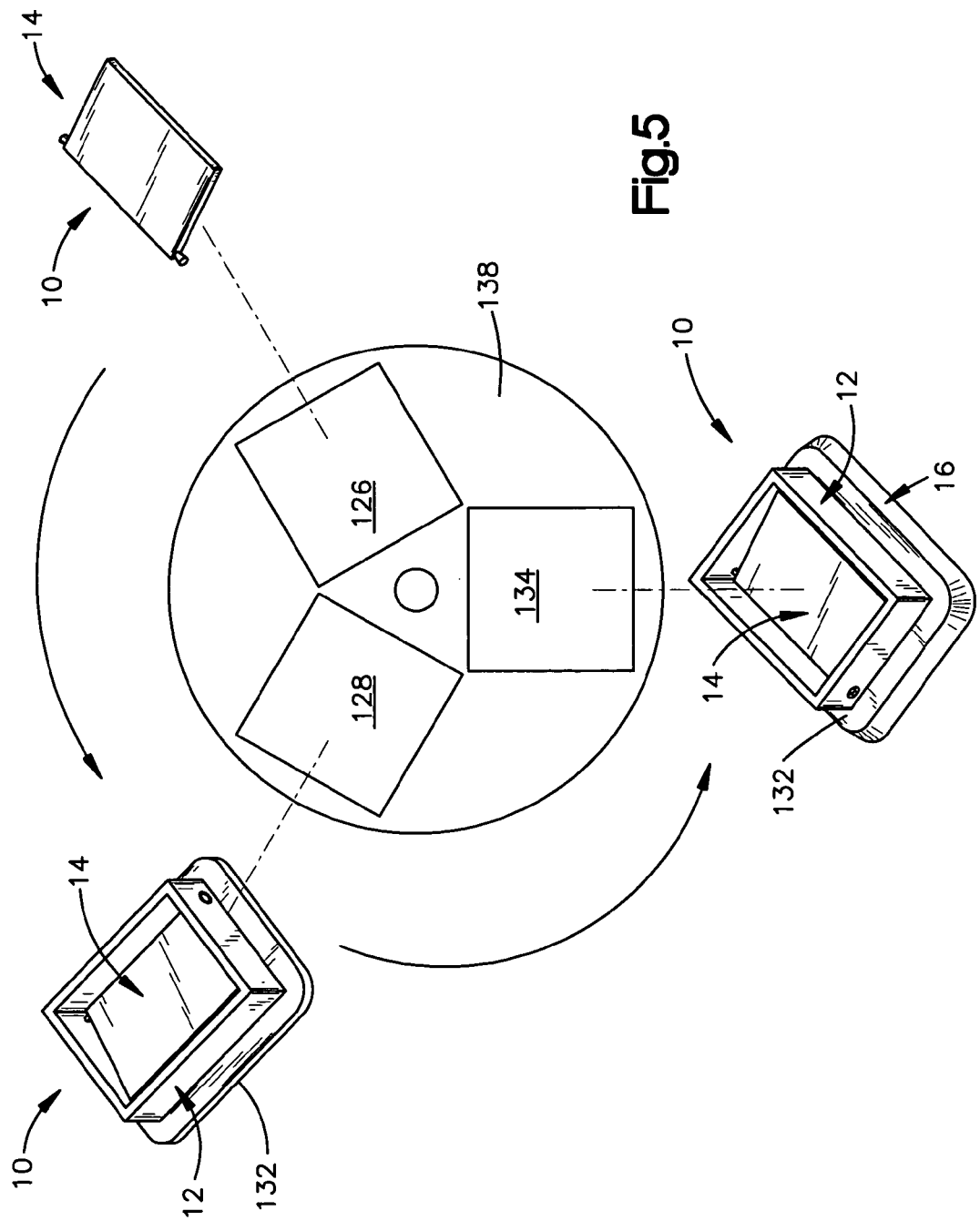

PRESSURE RELIEF VALVE AND METHOD OF FORMING THE SAME

TECHNICAL FIELD

The present invention relates to the field of air vents in vehicles and more particularly, to an integrally molded flap-type pressure relief valve for venting of air pressure out of a motor vehicle and to a method for making the pressure relief valve.

BACKGROUND OF THE INVENTION

Pressure relief valves are widely used in motor vehicles to relieve air pressure surges or peaks in the passenger compartment which result for example, when the doors are slammed shut. The valves generally comprise a simple rigid frame or housing which mounts in an aperture in a vehicle body panel. A valve element in the form of a normally flexible plastic flap is connected to the frame to overlie the aperture in the vehicle body panel. The valve element opens relative to the frame to uncover the aperture to relieve air pressure surges.

U.S. Pat. No. 5,715,782 discloses a composite molded butterfly valve for an internal combustion engine. A valve housing forms combustion air through passages and an axially extending valve bore defines an axis through the valve housing and bisects the through passages. Molded integrally within the valve housing is a molded composite valve member having an axial valve shaft, disposed in predetermined through bores. The valve member is rotatable in the valve bore to open and close the valve plates for regulation of air flow.

U.S. Pat. No. 4,546,695 discloses a grille unit for a vehicle with a frame and a vane pivotally connected to the frame via opposing first and second shafts. The frame has first and second holes snugly receiving the first and second shafts respectively. The first shaft has a peripheral surface, the diameter of which continuously varies along the axis thereof. The second shaft has a similar peripheral surface. The varying diameter surfaces of the first and second shafts face in opposite directions. The frame has a first inner surface which conforms to the varying diameter surface of the first shaft to engage the latter. The frame has a second inner surface which conforms to the varying diameter surface of the second shaft to engage the latter. A method of manufacturing the grille unit includes the steps of forming the frame from plastic, and assembling a mold with the frame positioned within the mold. A soft plastic is injected into the mold until the injected soft plastic fills the first and second holes of the frame.

U.S. Pat. No. 5,298,215 discloses a method for injection molding of objects of at least two independent parts, which are connected non-detachably but mutually rotatably, the subsequently produced part being injected at least partially into a mold recess of the previously produced part. An approximately hollow, cylindrical element is molded to the part produced first, in the region connecting this part to a rotatable part, that is to be produced subsequently. The hollow, cylindrical element is thereupon surrounded by a mold for the subsequent part and for the production of this part, either the outer space of the hollow cylindrical element which is closed off by a core, or the inner space of this hollow cylindrical element, which is not closed off, is injected for the production of this part. The part produced first is deformed in the region of the hollow cylinder into an undercut with rotational symmetry by the pressure of the material injected.

There exists a need for a pressure relief valve which consists of an integrally molded design with no subsequent assembly required before placement into the aperture in the body panel of the motor vehicle. There also exists a need for a pressure relief valve which has a low friction connection between the valve element and the frame so as to reduce an amount of torque required to open the valve element.

SUMMARY OF THE INVENTION

A pressure relief valve that relieves air pressure from a passenger compartment of a motor vehicle includes a housing formed from a first plastic material and having a peripheral side wall defining at least one central air flow passage and at least one flap valve element formed from a second plastic material different than the first plastic material. The housing and the flap valve element have a molded connection for enabling rotation of the flap valve element relative to the housing between a closed condition overlying the at least one central airflow passage to prevent air flow from atmosphere into the passenger compartment and an open condition permitting airflow out of the passenger compartment of the vehicle to atmosphere. The flap valve element moves from the closed condition to the open condition in response to differential pressure between the passenger compartment and atmosphere.

A method of manufacturing a pressure relief valve includes molding a valve element with a first plastic material and molding the housing with a second plastic material different from the first plastic material and forming a connection between the valve element and the housing simultaneous with the molding of a latter one of the valve element and the housing. The housing has a side wall defining a central air flow passage. The connection enables the valve element to move relative to the housing between a closed position overlying the at least one central air flow passage to prevent airflow from atmosphere into the passenger compartment and an open condition permitting airflow out of the passenger compartment of the vehicle to atmosphere.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a sectional view taken along line 3—3 in FIG. 2;

FIG. 4 is a sectional view taken along line 4—4 in FIG. 2;

FIG. 5 is a schematic perspective view of an in-mold assembly process for forming the pressure relief valve according to the present invention;

DESCRIPTION OF PREFERRED EMBODIMENT

Figure 1:
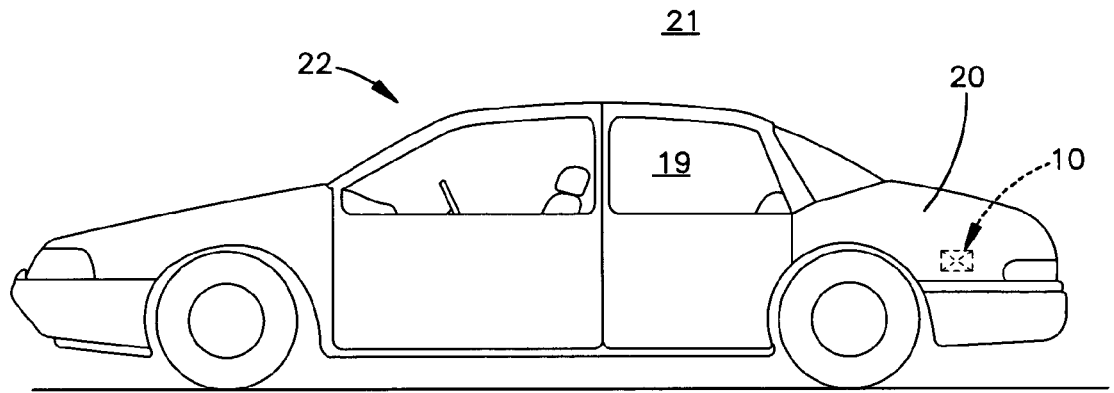
FIG. 1 is a schematic view of a motor vehicle with a pressure relief valve according to the present invention.

FIG. 1 shows a schematic view of the pressure relief valve 10 according the present invention located in an aperture of a vertical body panel 20 of a motor vehicle 22. The pressure relief valve can have alternative locations in the vehicle 22. According to the embodiment in FIG. 1, the pressure relief valve 10 is located in the area of the vehicle trunk which is connected to the passenger compartment 19. The pressure relief valve 10 of the present invention is designed to be mounted on the vertical panel 20 of the vehicle.

Figure 2:
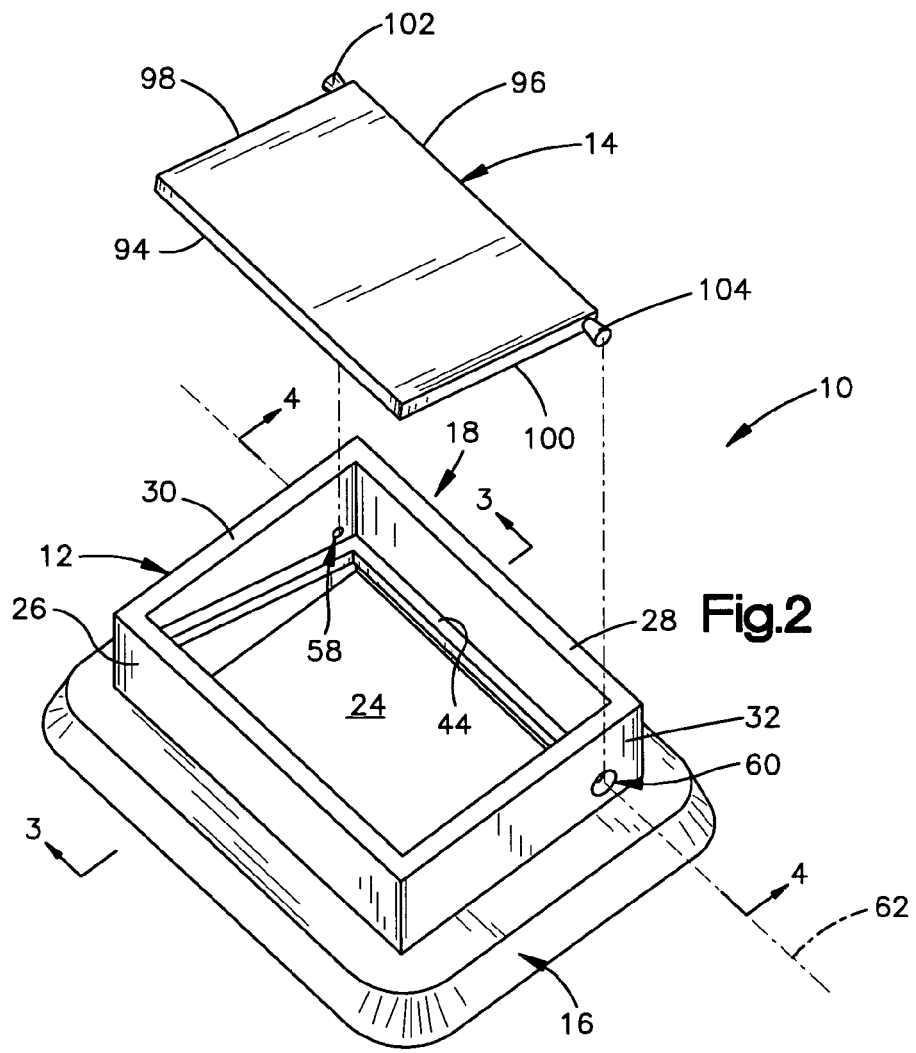
FIG. 2 is an exploded perspective view of a pressure relief valve of FIG. 1.

The pressure relief valve 10 is a pre-formed integrally molded plastic structure with no assembly required. FIG. 2 shows an exploded view of the pressure relief valve 10. The pressure relief valve 10 includes a housing 12, a flap valve element 14 and a seal 16. The housing 12 is a generally rectangular rigid plastic structure. The housing 12 includes a side wall 18 which extends around the perimeter of the rectangular housing and defines at least one central air flow passage 24.

While the housing has been described as having a generally rectangular structure, it should be understood, however, that the housing structure can have any geometry including, for example, square, triangular, polygonal, elliptical, and circular, etc.

The central air flow passage 24 connects the passenger compartment 19 with the atmosphere 21 outside the vehicle 22 and establishes an equalized air pressure between the passenger compartment 19 and the outside atmosphere 21.

The side wall 18 of the housing 12 comprises four side wall sections connected together. First and second longer side wall sections 26, 28 are located parallel to each other. First and second shorter side wall sections 30, 32 are located parallel to each other and perpendicular to the first and second longer side wall sections 26, 28.

Each of the first and second longer side wall sections 26, 28 have inner and outer surfaces 34, 36 spaced apart from each other (FIG. 3). Each of the first and second longer side wall sections 26, 28 have axially spaced apart top and bottom surfaces 38, 40. The top and bottom surfaces 38, 40 connect the inner and outer surfaces 34, 36 of each first and second longer side wall sections 26, 28.

The inner surface 34 of the first longer side wall section 26 includes a first cantilever 42 extending inwardly into the central air flow passage 24 from a location of approximately the top of the inner surface. The inner surface 34 of the second longer side wall 28 has a second cantilever 44 extending inwardly into the central air flow passage 24 from a location near the center of the inner surface. The first and second cantilevers 42, 44 on the inner surfaces 34 of the first and second longer side wall sections 26, 28 are located at different heights along the wall with respect to each other.

Each of the first and second shorter side wall sections 30, 32 have inner and outer surfaces 46, 48 spaced apart from each other (FIG. 4). Each of the first and second shorter side wall sections 30, 32 have axially spaced apart top and bottom surfaces 50, 52. The top and bottom surfaces 50, 52 connect the inner and outer surfaces 46, 48 of each first and second shorter side wall sections 30, 32.

The inner surface 46 of the first shorter side wall section 30 includes a first cantilever 54 extending inwardly into the central air flow passage 24 from the inner surface. The inner surface 46 of the second shorter side wall 32 has a second cantilever 56 extending inwardly into the central air flow passage 24 from the inner surface.

The first cantilever 54 extends diagonally along the inner surface 46 of the first shorter side wall 30 from a top portion to a middle portion of the first shorter side wall to connect the cantilevers 42 and 44 on the first and second longer side walls 26 and 28. The second cantilever 56 extends diagonally along the inner surface 46 of the second shorter side wall 32 from a top portion to a middle portion of the second shorter side wall to connect the cantilevers 42 and 44 on the first and second longer side walls 26 and 28. The first and second diagonal cantilevers 54, 56 are mirror images of one another.

FIG. 2 illustrates that the first shorter side wall section 30 includes a first circular through hole 58. The second shorter side wall section 32 includes a second circular through hole 60. The first and second through holes 58, 60 are coaxial along pivotal axis 62. The first through hole 58 extends through the first shorter side wall 30 from the inner surface 46 to the outer surface 48.

The first through hole 58 (FIG. 6) includes a first annular inner surface 70. The first annular inner surface 70 tapers outward diverging from axis 62 as it extends into the side wall 30 away from the inner surface 46. The diameter of the first annular inner surface 70 continuously varies and has a shape of a frustum. The first annular inner surface 70 becomes larger as it tapers outward from the inner surface 46 of the side wall 30.

The first through hole 58 includes a second annular surface 71 at a distance radially outward of the first annular surface. The second annular surface has a diameter approximately twice as large as the diameter of the first annular surface 70. It should be understood, however, that although the surface 71 is described as an annular surface, the surface 71 can have any shape providing that the surface 71 is spaced radially outward of the first annular surface by approximately twice the distance of the first diameter, or by a distance which allows for adequate clearance which will be described more fully hereinafter.

An enlarged view of the second through hole 60 is not shown. The second through hole 60 is a mirror image of the first through hole 58. As illustrated in FIG. 4, however, the second through hole 60 extends through the second shorter side wall 32 from the inner surface 46 to the outer surface 48 in the same manner as the first through hole 58. The second through hole 60 has an annular inner surface which is in a mirror image to the first through hole 58.

The outer surfaces 36 of the first and second longer side wall 26, 28 have a latch 82 (FIG. 3). While only one latch is shown on each wall, it should be understood that two or more latches may be located spaced apart from each other along the walls 26, 28 and/or in addition to side walls 30, 32.

An indentation 84 is located immediately above the latch 82 on the side walls 26, 28. The indentation 84 extends around the perimeter of the rectangular housing 12. Above the indentation 84 is a protrusion 86 extending around the perimeter of the rectangular housing 12. The pressure relief valve 10 is fastened in the aperture to the body panel 20 via the latch connection.

A flexible seal 16 (FIG. 2) extends from the protrusion 86 and extends peripherally around the rectangular housing 12 at an angle relative to the protrusion 86 in a direction towards the bottom surface 40, 52 of the side wall 18.

When the pressure relief valve 10 is inserted into the aperture in the body panel 20, the seal 16 is forced into contact with the body panel 20 at an area peripherally adjacent the side wall 18 of the housing 12 (FIGS. 3–4) In the inserted position, the seal 16 is forced to spread outwardly and parallel relative to the body panel 20. The function of the seal 16 is to help seal the connection between the pressure relief valve 10 and the body panel 20 of the vehicle 22 against air, water, dust and foreign matter from passing through the aperture except through the central air passage 24.

In the embodiment according to FIG. 2, the pressure relief valve 10 includes a flap valve element 14. The valve element 14 has a generally solid but flexible rectangular flap structure. It also should be understood that the flap can have any shape such as triangular or square. The valve element 14 has first and second longer peripheral edges 94, 96 located spaced apart and parallel to each other and first and second shorter peripheral edges 98, 100 located spaced apart and parallel to each other.

The valve element 14 has first and second shafts 102, 104 which extend in opposite directions from each other and are coaxial along axis 62. The first and second shafts 102, 104 define a pivotal axis 62 parallel to and immediately adjacent the peripheral edge 96 of the flap valve element 14. The pivotal axis 62 is spaced apart from a center of the flap valve element 14.

The first shaft 102 extends outward from the first shorter peripheral edge 98 in a location immediately adjacent the second longer peripheral edge 96. The second shaft 104 extends outward from the second shorter peripheral edge 100 in a location immediately adjacent the second longer peripheral edge 96.

Figure 6:
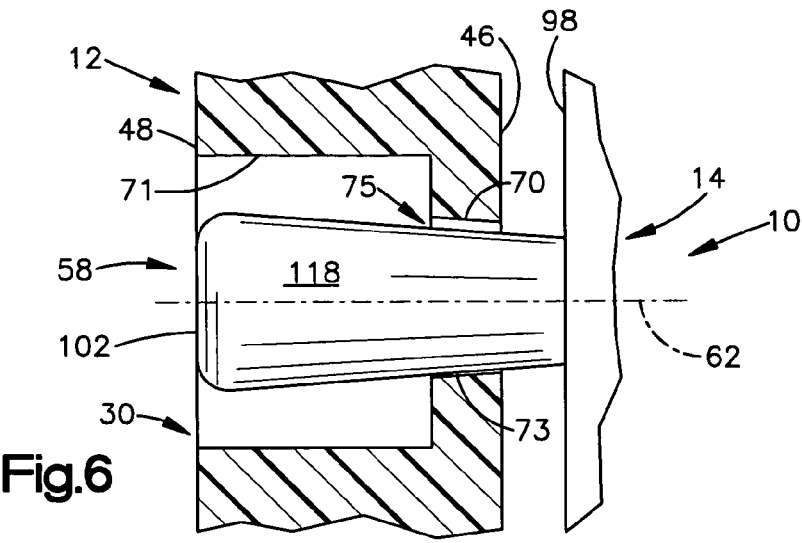
FIG. 6 is an enlarged partial sectional view of a first embodiment of the invention from FIG. 4.

An enlarged cross sectional view of the first shaft 102 is illustrated in FIG. 6. The first shaft 102 has a continuously varying diameter outer surface 118 that tapers outward diverging from axis 62 as it extends away from the edge 98. The cross sectional diameter of the first shaft continuously increases as it extends away from edge 98.

The second shaft 104 is a mirror image of the first shaft 102. An enlarged view of the second shaft 104 is not shown. However, the second shaft 104 also has a continuously varying diameter outer surface that tapers outward diverging from axis 62 as the second shaft extends away from the edge. Also, the cross sectional diameter of the second shaft increases away from the edge.

The housing 12 is integrally molded to the valve element 14 by first and second spaced apart molded hinge connections 110, 112 (FIG. 4) defined by the shafts 102, 104 and the through holes 58, 60 of the housing. The first hinge connection 110 comprises the connection between the side wall 30 (at through hole 58) and the first shaft 102 of the valve element 14.

The continuously varying diameter inner surface 70 of the side wall through hole 58 forms line contact 73 with the continuously varying diameter outer surface 118 of the first shaft 102. The position of the line contact 73 in FIG. 6 is shown for illustration purposes only. It should be understood that the position of the line contact 73 will vary. The line contact 73 will form at an infinite number of positions around the diameter of the shaft 102 and the annular surface 70 during relative rotation and even in a rest position taking the effect of gravity into account.

A clearance area 75 is shown between the shaft 102 and the first annular surface on the side opposite the line contact 73 when viewed in FIG. 6. However, it should be understood that the clearance area is actually formed around the entire diameter of the shaft 102 and the annular surface 70 except for the location where line contact 73 is formed.

The line contact 73 formed between the shaft 102 and first annular surface 70 minimizes frictional resistance to rotation at the valve element.

Hypothetically, if the pressure relieve valve 10 were in a zero gravity environment, a clearance area would form around the entire diameter between the shaft 102 and annular surface 70 and no line contact is formed.

Similarly, the second hinge connection 112 (FIG. 4) comprises the connection between the side wall 32 (at through hole 60) and the second shaft 104 of the valve element 14. The continuously varying first diameter inner surface of the side wall through hole conforms to and forms line contact with the continuously varying first diameter outer surface of the second shaft.

The valve element 14 is rotatable relative to the housing 12 about the first and second hinge connections 110, 112 in the manner of a flap. Only a minimal amount of differential air pressure is needed to achieve relative rotation about the first and second hinge connections 110, 112. No manual force is needed to effect relative rotation about the first and second hinge connections 110, 112 to open the flap.

The valve element 14 is movable between a closed condition overlying the central air flow passage 24 and an open condition (shown by dashed lined) to permit air flow through the central air flow passage 24 in only one direction, (upward as viewed in FIG. 3). In the closed condition, the first and second shorter side edges 98, 100 are seated on the cantilevers 54, 56. Similarly, in the closed condition, the first and second longer peripheral edges 94, 96 of the valve element 14 are seated on the cantilevers 42, 44 of the first and second longer side walls 26, 28.

The valve element 14 can only open in a direction outward of the housing 12 (upward as viewed in FIG. 3) and cannot open in a direction into the housing 12 (downward in FIG. 3) because the cantilevers block movement of the valve element inward. The cantilevers 54, 56 extend in a linear direction horizontally along the first and second longer side walls 26, 28. Since the cantilevers 42, 44 extend in a diagonal direction along the first and second shorter side walls 30, 32, the valve element 14 also extends diagonally when the valve element is in the closed condition and seated on the cantilevers 54, 56 and 42, 44.

The pressure relief valve 10 of the present invention is operable from the closed condition to the open condition in response to differential air pressure between the passenger compartment 19 of the vehicle 22 and atmosphere 21 outside of the vehicle. FIG. 1 illustrates the location of the passenger compartment 19 and atmosphere 21 relative to the pressure relief valve 10 when mounted vertically to a body panel 20 of the vehicle 22.

An enlarged view of the vertically mounted pressure relief valve 10 in the body panel 20 of the vehicle is shown in FIG. 3 oriented in a direction along arrow D. In this orientation, the hinge connections 110, 112 are located near the top when mounted to the body panel 20. In the closed position, the valve element 14 extends in a diagonally downward direction. The valve element 14 is acted on by gravity which supplies gravitational force to keep the valve element in the closed condition if the air pressure within the passenger compartment 19 of the vehicle 22 and atmospheric pressure are equal.

When atmospheric pressure is increased above the pressure within the passenger compartment 19 of the vehicle, the atmospheric pressure acts against the valve element in a direction along arrow C as viewed in FIG. 3. The valve element 14 remains in the closed condition. The valve element 14 does not rotate since the edges of the valve element are seated against the cantilevers 42, 44 and 54, 56 and the cantilevers prevent movement of the valve element relative to the housing inward. As a result, airflow, water, dust, foreign matter from the atmosphere 21 entering through the central air passage 24 into the passenger compartment 19 of the vehicle 22 is prevented.

When air pressure within the passenger compartment 19 of the vehicle 22 is increased above atmospheric pressure, the air pressure within the passenger compartment 19 acts in a direction along arrow 0 as viewed in FIG. 3, against the valve element 14. When the air pressure within the passenger compartment 19 is greater than atmospheric pressure by a predetermined level, i.e., a level to overcome the gravitational force upon the valve element 14 to remain in the closed position, the valve element will rotate, in a direction outward of the housing 12, about the first and second hinge connections 110, 112 to unseat itself from the cantilevers 42, 44 and 54, 56 of the housing 12 and to uncover the central air passage and enable airflow from the passenger compartment 19 to atmosphere 21.

When the valve element 14 rotates about the first and second hinge connections 110, 112 to unseat itself from the cantilevers 42, 44 and 54, 56 of the housing 12 and to uncover the central air passage 24 and enable airflow from the passenger compartment 19 to atmosphere 21, the valve element is in the open condition.

When the differential air pressure between the passenger compartment 19 of the vehicle and atmosphere 21 falls below the predetermined level, the gravitational force upon the valve element 14 causes the valve element to rotate back to the closed condition.

The line contact 73 formed between the shafts 102, 104 and the side walls 30, 32 at the first and second hinge connections 110, 112 minimizes the differential air pressure necessary to rotate the valve element 14 to the open condition.

Figure 7:
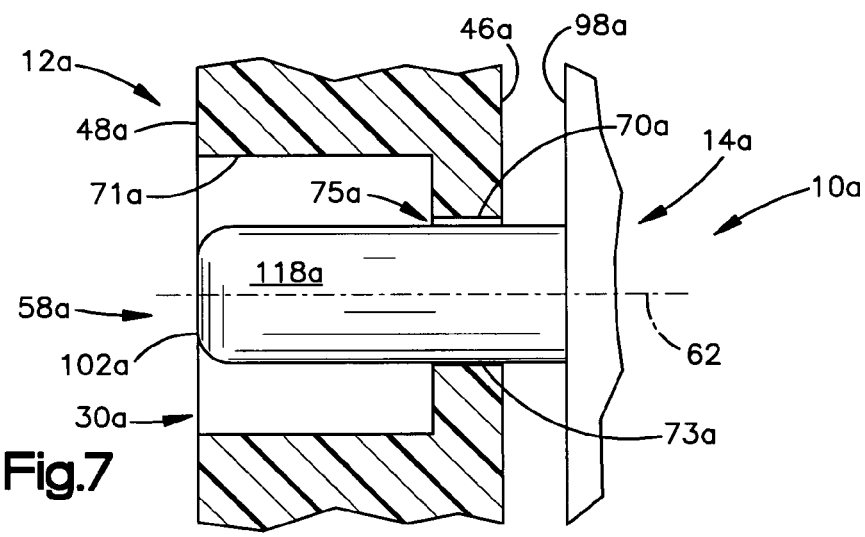
FIG. 7 is an enlarged partial sectional view of a second embodiment of the invention.

Alternatively, in a second embodiment of the pressure relief valve 10a, shown in FIG. 7, the through hole 58a in the side wall 30a of the housing 12a includes a constant diameter first annular inner surface 70a. The through hole 58a includes a second annular surface 71a. The second annular surface has a diameter approximately twice as large as the first annular surface 70a. The second annular surface 71a has a constant diameter. In addition, the shaft 102a of the valve element 14a also has a constant diameter outer annular surface 118a and forms line contact with the first inner annular surface 70a of the side wall of the housing 12a. All structures in FIG. 7, equivalent to the pressure relief valve of FIG. 6, are shown with the suffix "a".

Figure 8:
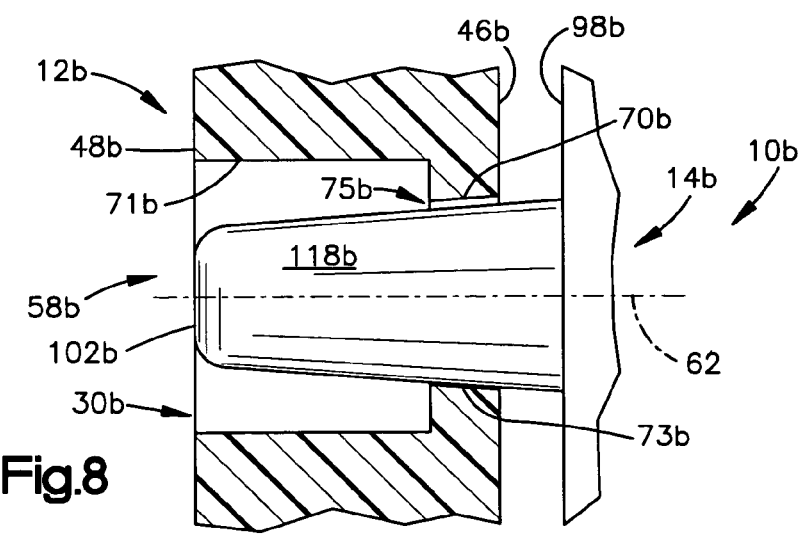
FIG. 8 is an enlarged partial sectional view of a third embodiment of the invention.

In a third embodiment of the pressure relief valve 10b shown in FIG. 8, the through hole 58b in the side wall 30b of the housing 12b has a continuously varying diameter annular inner surface 70b which tapers outward converging to axis 62 as the through hole extends from the inner surface 46b to the outer surface 48b, in a manner opposite the first embodiment. The through hole 58b includes a second annular surface 71b. The second annular surface has a diameter approximately twice as large as the first annular surface 70b. The second annular surface 71b has a constant diameter.

The shaft 102b has a continuously varying diameter annular outer surface 118b which tapers outward converging to axis 62 as the shaft 102b extends from the peripheral edge 98b. The line contact 73b is formed between the annular outer surface 118b of the shaft 102b and the first inner annular surface 70b of the through hole 58b. All structures in FIG. 8, equivalent to the pressure relief valve of FIG. 6, are shown with the suffix "h".

The housing 12 is made of polypropylene. The valve element 14 is formed from a plastic material different than the plastic material used for forming the housing 12. The valve element 14 is made of nylon PA66. Polypropylene and PA66 are dissimilar materials in that they have different properties making them difficult to bond to one another without the addition of a separate adhesive.

Instead of the housing 12 being made from polypropylene, the housing can be made from another suitable material. Other suitable materials for the housing 12 include but are not limited to PA6 (nylon 6), PA66, PBT (Polybutylene Terephthalate), and ABS (Acrylonitrile Butadiene Styrene) or a blend thereof. Instead of the valve element 14 being made from PA66, the valve element can be made from another suitable material. Other suitable materials for the valve element 14 include but are not limited to PA6 (nylon 6), PBT (Polybutylene Terephthalate) and polypropylene or a blend thereof. The material of the valve element 14, however, cannot be the same material as the housing 12 when molding the pressure relief valve 10.

The flexible seal 46 is made of a thermoplastic elastomer such as thermoplastic rubber, thermoplastic olefin or thermoplastic vulcanizate. An example of thermoplastic vulcanizate is SANTOPRENE™. The type of thermoplastic elastomer chosen to mold the flexible seal 16 should preferably bond easily to any one of the above-mentioned suitable materials used to make the housing 12, without the need for molding a the housing and seal so that the they are mechanically interlocked when molded. Alternatively, the seal and housing can be molded in a manner to form an interlocking seal and housing portion. The housing and seal are mechanically interlocked during molding, while in the in-mold-assembly, so that no subsequent manual assembly of the seal and housing is needed after molding is complete.

An integrally molded connection between the housing 12 and the valve element 14 means that no subsequent assembly is required to connect the valve element and the housing after molding takes place. The molded connection between the housing 12 and the valve element 14 requires no separate fasteners or screws or any other separate fastening means. The integral connection between the housing 12 and the valve element 14 is formed during an in-mold assembly technique known as multi-shot injection mold technology. The housing 12, the seal 16 and the valve element 14 of the pressure relief valve 10 are integrally molded into a single structure by this technique.

With respect to the pressure relief valve 10 of the first embodiment shown in FIG. 6, the valve element 14 is molded first and the housing 12 is molded subsequent. The in-mold assembly process (FIG. 5) has a first injection station (not shown) for injecting the first plastic material into a first mold cavity 126 defining the valve element 14. After the valve element 14 is molded, the valve element is removed from the first cavity 126 and inserted into a second mold cavity 128.

The molded valve element 14 defines part of the mold for subsequently molding the housing 12. The valve element 14 is placed into the second mold cavity 128. The second mold cavity 128 as well as the molded valve element 14 together define the mold for the housing 12 for integrally molding the housing with the valve element into a single structure.

The in-mold assembly process has a second injection station (not shown) for injecting the second thermoplastic material into the second mold cavity 128 to mold the housing 12 integrally with the valve element 14.

The melting point of the plastic material used to mold the valve element 14 is higher than the melting point of the plastic material used to mold the housing 12. The valve element 14 does not melt during the molding of the housing 12.

Plastic materials have inherent shrinkage rates which can be used to calculate the amount of shrinkage of a molded part as the plastic cools. During the injection molding process with respect to the embodiment shown in FIG. 6 of the present invention, the plastic material of the valve element 14 is injection molded first and forms first and second shafts 102, 104 which are predefined by a geometry in the first mold cavity 126. The first and second shafts 102, 104 define a boundary around which the plastic material of the housing 12 is subsequently injected in the second injection station to form the through holes 58, 60.

Because the melting point of the plastic material used to form the valve element 14 is higher than the melting point of the plastic material used to form the housing 12, the valve element can function as part of the mold used to form the housing. The continuously varying diameter annular surfaces of the shafts 102, 104 function as part of the mold used to form the integral connection between the housing and the valve element.

As it cools, the plastic material of the housing 12 at the location of the first and second through holes 58, 60, shrinks away from the shafts 102, 104 leaving a clearance area 70 around the entire diameter between the housing and the valve element.

The plastic materials used to mold the valve element 14 and the housing 12 have dissimilar properties. The plastic material of the housing does not adhere to or bond with the plastic material of the valve element during the molding process. As a result, the molded valve element 14 is rotatable relative to the housing 12 when the shafts are formed in engagement with the side walls 30, 32.

After the housing 12 is integrally molded with the valve element 14, the resulting single structure 132 is removed from the second mold cavity 128 and inserted into a third mold cavity 134. The third mold cavity 134 defines the cavity for forming the seal 16.

The in-mold assembly process has a third injection station (not shown) for injecting the third plastic material into the third mold cavity 134 to mold the seal 16 around the perimeter of the valve element 14 of the integrally molded housing and valve element 132. After the seal 16 is molded onto the valve element 14, the completed pressure relief valve 10 is ejected from the third mold cavity 134. No further assembly is required before the pressure relief valve 10 is mounted in an aperture of the body panel 20 of the vehicle 22.

During the in mold assembly process, the valve element 14 is transferred from the first mold cavity 126 to the second mold cavity 128 and the integrally molded housing and valve element 132 is transferred from the second mold cavity 128 to the third mold cavity 134 by a technique known in the art as rotary indexing. The transfer between the first, second and third mold cavities 126, 128 and 134 is schematically represented with arrows in FIG. 6.

By using vertical injection units, a rotary table 138 can be used to index the mold through the first, second and third plastic material injection stations (not shown). In this case, the table 138 rotation is 120 degrees between each station. The mold cavities 126, 128, 134 lie on a horizontal plane. The mold cavities 126, 128, 134 themselves are rotated by a servo motor in the table 138 to bring each intermediate stage of the pressure relief valve 10 to the new cavities. Alternatively, each step may be performed in separate injection molding machines. In addition, other more complex in mold assembly techniques can be used to mold the pressure relief valve 10.

With respect to the embodiments shown in FIGS. 7–8, the housing is molded first. This is opposite to the embodiment shown in FIG. 6. Subsequently, the valve element is integrally molded with the housing into a single structure and the seal is molded last. If the housing is molded first and subsequently the valve element is integrally molded with the housing, the group of materials used to form the valve element of the embodiment of FIG. 6, can be wholly interchanged with, the group of materials used to form the housing of the embodiment of FIG. 6.

In the method for forming the pressure relief valve according to FIGS. 7–8, the materials used to form the housing will have a higher melting point than the materials used to form the valve element so that upon forming the integral connection between the housing and the valve element, the housing can form part of the mold to form the valve element.

In addition, the specific order of the steps of the in mold assembly process can vary from the above illustration. In one variation of the method with respect to the embodiments of FIGS. 7–8, for example, after the step of initially molding the housing, the subsequent steps of molding the valve element and molding the seal can be reversed. Thus, the seal can be molded after the housing is molded and before the valve element is molded.

From the above description of the invention, those skilled in the art will perceive improvements, changes and modifications. For example, instead of one flap valve element, multiple flap valve elements can be integrally molded with the housing in multiple through holes to form the pressure relief valve 10. Such improvements, changes and modifications within the skill of the art are intended to be covered by the appended claims.

Having described the invention, we claim the following:

1. A pressure relief valve for relieving air pressure from a passenger compartment of a motor vehicle, the pressure relief valve comprising:
   a housing formed from a first plastic material and having a peripheral side wall defining at least one central air flow passage; and
   at least one flap valve element formed from a second plastic material different than said first plastic material; said housing and said flap valve element having a molded connection for enabling rotation of said flap valve element relative to said housing between a closed condition overlying said at least one central airflow passage to prevent air flow from atmosphere into the passenger compartment of the vehicle and an open condition permitting airflow out of the passenger compartment of the vehicle to atmosphere, said at least one flap valve element moving from the closed condition to the open condition in response to differential pressure between the passenger compartment of the vehicle and atmosphere.

2. The pressure relief valve according to claim 1 further having structure defining a pivotal axis located parallel to and immediately adjacent a peripheral edge of said flap valve element.

3. The pressure relief valve according to claim 2 wherein said structure includes coaxial shafts extending from opposite peripheral edges of said at least one flap valve element.

4. The pressure relief valve according to claim 3 wherein said molded connection comprises line contact between said coaxial shafts and said peripheral side wall of said housing.

5. The pressure relief valve according to claim 3 wherein said coaxial shafts extending from said opposite peripheral edges of said flap valve element have an annular surface which has a continuously varying diameter and forms a frustum shape.

6. The pressure relief valve according to claim 3 wherein at least one of said coaxial shafts extending from said opposite peripheral edges of said flap valve element has a constant diameter annular surface.

7. The pressure relief valve according to claim 1 further including a flexible seal integrally molded with said housing and extending outwardly from said peripheral side wall of said housing.

8. The pressure relief valve according to claim 1 wherein said peripheral side wall of said housing includes at least one latch for mounting said housing into an aperture located in a body panel of the motor vehicle.

9. The pressure relief valve according to claim 1 wherein said first plastic material and said second plastic material have chemical properties which prevent said first and second plastic materials from adhering to each other or bonding to each other without additional adhesive.

10. The pressure relief valve according to claim 1 wherein said second plastic material has a lower melting point than said first plastic material.

11. The pressure relief valve according to claim 1 wherein two opposing side walls of said housing define at least one coaxial through hole.

12. The pressure relief valve according to claim 11 wherein said at least one coaxial through hole comprises a first annular surface having a continuously varying diameter in the shape of a frustum and a second annular surface at a distance radially outward from said first annular surface.

13. The pressure relief valve according to claim 11 wherein said at least one coaxial through hole comprises a portion including an annular surface having a constant diameter.

14. The pressure relief valve according to claim 1 wherein said flap valve element is rotatable between the closed condition and the open condition relative to said housing.

15. A method of manufacturing a pressure relief valve for relieving air pressure from a passenger compartment of a vehicle, said pressure relief valve comprising a housing integrally molded with a flap valve element, said method comprising the steps of:
    molding the flap valve element with a first plastic material;
    molding the housing with a second plastic material different from the first plastic material, the housing having a side wall defining a central air flow passage; and
    forming a connection between the flap valve element and the housing simultaneous with the molding of the housing, the connection enabling the flap valve element to move relative to the housing between a closed position overlying the central air flow passage to prevent airflow from atmosphere into the passenger compartment and an open condition permitting airflow out of the passenger compartment of the vehicle to atmosphere.

16. The method according to claim 15 further including the step of molding a seal integrally with the housing from a third plastic material different from the first and second plastic materials.

17. The method according to claim 15 wherein the step of molding the housing with the flap valve element includes the steps of:
    molding coaxial solid shafts of the flap valve element;
    molding coaxial through holes defined by side walls of the housing around the coaxial solid shafts; and
    forming a clearance between the coaxial through holes and the coaxial solid shafts.

18. The method according to claim 17 wherein the step of molding the housing with the flap valve element includes the steps of:
    molding a continuously varying diameter annular surface of each of the coaxial solid shafts which diverges from a central axis, and
    molding a continuously varying diameter annular surface of each of the through holes which diverges from the central axis.

19. The method according to claim 17 wherein said step of forming the connection comprises the step of forming line contact between the coaxial solid shafts of the flap valve element and the side walls of the housing.

20. The method according to claim 17 wherein at least one of the first and second plastic materials shrinks when cooling to form clearance areas between the coaxial solid shafts and the side walls.

21. The method according to claim 17 wherein the coaxial solid shafts are rotatable relative to the through holes in the housing.

22. The method according the claim 15 wherein the first plastic material and the second plastic material have chemical properties which prevent the first and second plastic materials from adhering to each other or bonding to each other without additional adhesive.

23. A method of manufacturing a pressure relief valve for relieving air pressure from a passenger compartment of a vehicle, the pressure relief valve comprising a housing integrally molded with a flap valve element, said method comprising the steps of:
    molding the housing with a first plastic material, the housing having a side wall defining a central air flow passage;
    molding the flap valve element with a second plastic material different from the first plastic material; and
    forming a connection between a member of the flap valve element and a through hole of the housing simultaneous with the molding of the flap valve element, the connection enabling the member of the flap valve element to contact a surface of the through hole of the housing and slide on the surface of the through hole of the housing relative to the housing while the flap valve element moves between a closed position overlying the central air flow passage to prevent airflow from atmosphere into the passenger compartment and an open condition permitting airflow out of the passenger compartment of the vehicle to atmosphere.

24. The method according to claim 23 further including the step of molding a seal integrally with the housing from a third plastic material different from the first and second plastic materials.

25. The method according the claim 23 wherein the first plastic material and the second plastic material have chemical properties which prevent the first and second plastic materials from adhering to each other or bonding to each other without additional adhesive.

26. A method of manufacturing a pressure relief valve for relieving air pressure from a passenger compartment of a vehicle, the pressure relief valve comprising a housing integrally molded with a flap valve element, said method comprising the steps of:

molding the housing with a first plastic material, the housing having a side wall defining a central air flow passage;

molding the flap valve element with a second plastic material different from the first plastic material; and forming a connection between the flap valve element and the housing simultaneous with the molding of the flap valve element, the connection enabling the flap valve element to move relative to the housing between a closed position overlying the central air flow passage to prevent airflow from atmosphere into the passenger compartment and an open condition permitting airflow out of the passenger compartment of the vehicle to atmosphere, said step of molding the flap valve element with the housing includes the steps of:

molding coaxial solid shafts of valve element;

molding coaxial through holes defined by side walls of the housing around the coaxial solid shafts; and forming a clearance between the through holes and the coaxial solid shafts.

27. The method according to claim 26 wherein the step of molding the flap valve element with the housing includes the steps of:

molding a continuously varying diameter annular surface of the through holes which converges to the central axis; and molding a continuously varying diameter annular surface of the coaxial solid shafts which converges to a central axis.

28. The method according to claim 26 wherein said step of molding the flap valve element with the housing includes the steps of:

molding a constant diameter annular surface of the through holes; and molding a constant diameter annular surface of the coaxial solid shafts.

29. The method according to claim 26 wherein said step of forming the connection comprises the step of forming line contact between the coaxial solid shafts of the flap valve element and the side walls of the housing.

30. The method according to claim 26 wherein the coaxial solid shafts are rotatable relative to the through holes in the housing.

* * * * *